(12) United States Patent
Honjo et al.

(10) Patent No.: US 11,194,120 B2
(45) Date of Patent: Dec. 7, 2021

(54) LENS DEVICE, CAMERA DEVICE, AND MOVABLE BODY

(71) Applicant: SZ DJI TECHNOLOGY CO., LTD., Shenzhen (CN)

(72) Inventors: Kenichi Honjo, Shenzhen (CN); Takashi Koyama, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/898,200

(22) Filed: Jun. 10, 2020

(65) Prior Publication Data

US 2020/0301096 A1 Sep. 24, 2020

Related U.S. Application Data

(63) Continuation of application No. PCT/CN2018/119756, filed on Dec. 7, 2018.

(30) Foreign Application Priority Data

Dec. 19, 2017 (JP) .............................. JP2017-243196

(51) Int. Cl.
*G02B 7/04* (2021.01)
*B64C 39/02* (2006.01)
*B64D 41/00* (2006.01)
*B64D 47/08* (2006.01)
*G03B 5/02* (2021.01)
(Continued)

(52) U.S. Cl.
CPC .............. *G02B 7/04* (2013.01); *B64C 39/024* (2013.01); *B64D 41/00* (2013.01); *B64D 47/08* (2013.01); *G03B 5/02* (2013.01); *G03B 13/34* (2013.01); *G03B 15/006* (2013.01);
(Continued)

(58) Field of Classification Search
CPC ................................. G02B 7/04; G03B 13/34
See application file for complete search history.

(56) References Cited

U.S. PATENT DOCUMENTS 6,658,954 B1 12/2003 Bosa et al.
10,921,550 B2 * 2/2021 Koyama .................. G02B 7/09
(Continued)

FOREIGN PATENT DOCUMENTS

| CN | 1797058 A | 7/2006 |
| CN | 1952717 A | 4/2007 |

(Continued)

OTHER PUBLICATIONS

The Intellectual Property Organization (WIPO) International Search Report for PCT/CN2018/119756 dated Feb. 27, 2019 7 pages.

*Primary Examiner* — Clayton E. LaBalle
*Assistant Examiner* — Dennis Hancock
(74) *Attorney, Agent, or Firm* — Anova Law Group, PLLC

(57) ABSTRACT

A lens device includes a first electric motor, a second electric motor, a lens, a cam ring, a first gear, a second gear, and a controller. The cam ring is configured to drive the lens in a direction of an optical axis of the lens. The first gear is configured to transmit power generated by the first electric motor to the cam ring. The second gear is configured to transmit power generated by the second electric motor to the cam ring. The controller is configured to, when controlling the cam ring to stop rotating, first stop a rotation of the first electric motor and then stop a rotation of the second electric motor.

20 Claims, 6 Drawing Sheets

(51) Int. Cl.
*G03B 13/34* (2021.01)
*G03B 15/00* (2021.01)

(52) U.S. Cl.
CPC . *B64C 2201/027* (2013.01); *B64C 2201/108* (2013.01); *B64C 2201/127* (2013.01)

(56) References Cited

U.S. PATENT DOCUMENTS

| | | | |
|---|---|---|---|
| 2003/0015051 A1 | 1/2003 | Nomura et al. | |
| 2006/0115257 A1* | 6/2006 | Nomura | H04N 5/23287 396/55 |
| 2011/0237386 A1 | 9/2011 | Hirtt et al. | |
| 2011/0292523 A1* | 12/2011 | Uehara | G02B 7/1805 359/699 |
| 2015/0124331 A1 | 5/2015 | Fujinaka | |
| 2015/0381858 A1* | 12/2015 | Sterngren | F16M 11/18 348/143 |
| 2016/0054540 A1* | 2/2016 | Kogure | G02B 7/026 359/824 |

FOREIGN PATENT DOCUMENTS

| | | |
|---|---|---|
| CN | 101280823 A | 10/2008 |
| CN | 102313961 A | 1/2012 |
| CN | 102812391 A | 12/2012 |
| CN | 103744439 A | 4/2014 |
| CN | 203993162 U | 12/2014 |
| CN | 204843676 U | 12/2015 |
| CN | 107209343 A | 9/2017 |
| JP | 2598758 Y2 | 8/1999 |
| JP | 2005186192 A | 7/2005 |
| JP | 2007315420 A | 12/2007 |
| JP | 2009213190 A | 9/2009 |
| JP | 2016027376 A | 2/2016 |
| JP | 2017151458 A | 8/2017 |
| WO | 2009117051 A1 | 9/2009 |

\* cited by examiner

LENS DEVICE, CAMERA DEVICE, AND MOVABLE BODY

CROSS-REFERENCE TO RELATED APPLICATION

This application is a continuation of International Application No. PCT/CN2018/119756, filed Dec. 7, 2018, which claims priority to Japanese Application No. 2017-243196, filed Dec. 19, 2017, the entire contents of both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to a lens device, a camera device, and a movable body.

BACKGROUND

Document 1, Japanese Utility Model Registration No. 2598758, discloses a lens driving device, which includes a motor for driving a zoom lens and a motor for driving a focus lens.

SUMMARY

Embodiments of the present disclosure provide a lens device includes a first electric motor, a second electric motor, a lens, a cam ring, a first gear, a second gear, and a controller. The cam ring is configured to drive the lens in a direction of an optical axis of the lens. The first gear is configured to transmit power generated by the first electric motor to the cam ring. The second gear is configured to transmit power generated by the second electric motor to the cam ring. The controller is configured to, when controlling the cam ring to stop rotating, first stop a rotation of the first electric motor and then stop a rotation of the second electric motor.

Embodiments of the present disclosure provide a camera device including a lens device and a camera. The lens device includes a first electric motor, a second electric motor, a lens, a cam ring, a first gear, a second gear, and a controller. The cam ring is configured to drive the lens in a direction of an optical axis of the lens. The first gear is configured to transmit power generated by the first electric motor to the cam ring. The second gear is configured to transmit power generated by the second electric motor to the cam ring. The controller is configured to, when controlling the cam ring to stop rotating, first stop a rotation of the first electric motor and then stop a rotation of the second electric motor. The camera is configured to image using light captured by the lens device.

Embodiments of the present disclosure provide a movable body. The movable body moves and includes a propeller and a camera device. The camera device includes a lens device and a camera. The propeller is configured to drive the movable body to move. The lens device includes a first electric motor, a second electric motor, a lens, a cam ring, a first gear, a second gear, and a controller. The cam ring is configured to drive the lens in a direction of an optical axis of the lens. The first gear is configured to transmit power generated by the first electric motor to the cam ring. The second gear is configured to transmit power generated by the second electric motor to the cam ring. The controller is configured to, when controlling the cam ring to stop rotating, first stop a rotation of the first electric motor and then stop a rotation of the second electric motor. The camera is configured to image using light captured by the lens device.

REFERENCE NUMERALS

Figure 1:
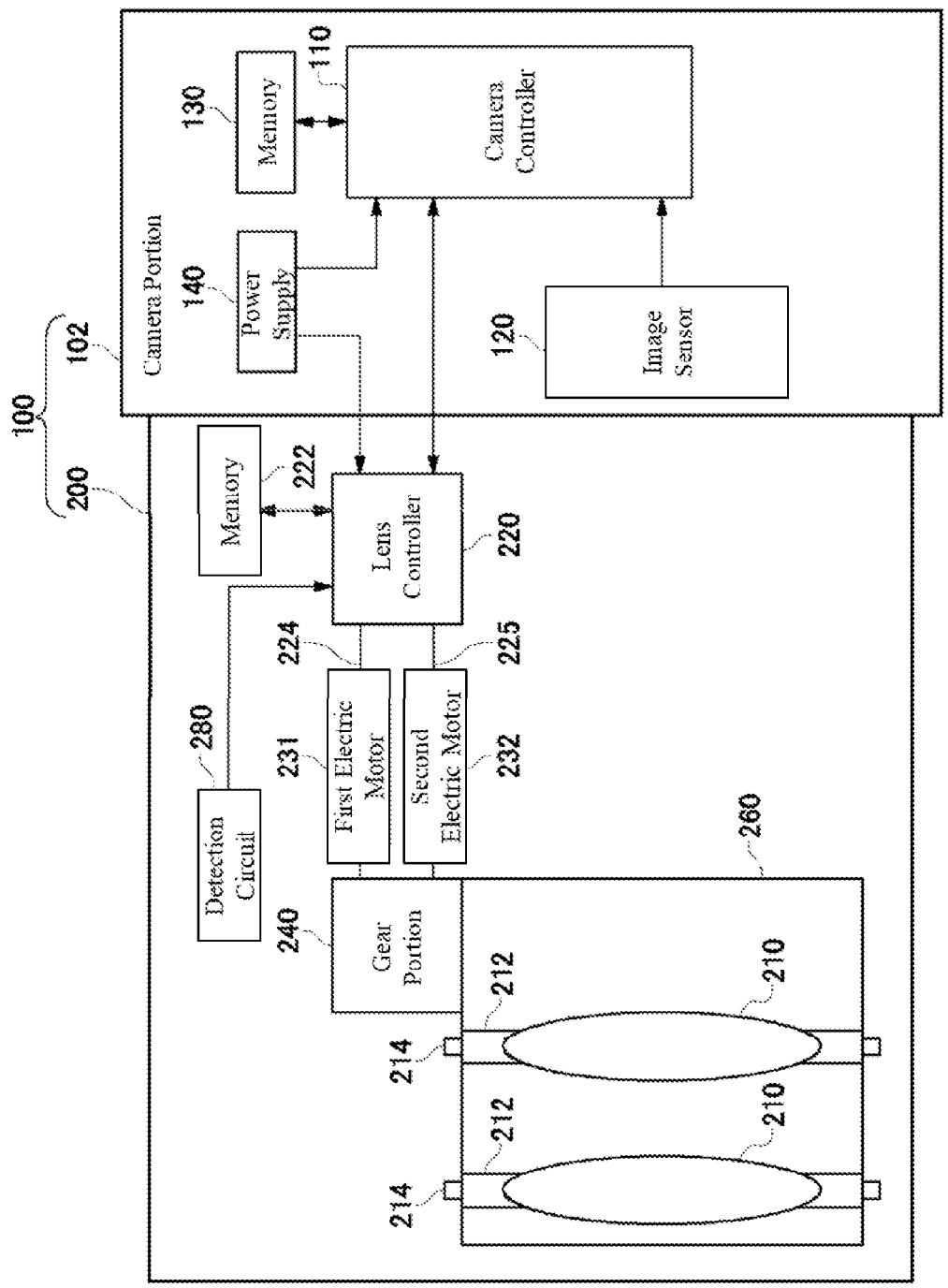
FIG. 1 illustrates an exemplary schematic diagram of a functional block of a camera device according to some embodiments of the present disclosure.

10 UAV
20 UAV body
50 Gimbal
60 Camera device
100 Camera device
102 Camera portion
110 Camera controller
120 Image sensor
130 Memory
140 Power supply
200 Lens device
210 Lens
212 Lens holder
214 Pin
220 Lens controller
222 Memory
231 First electric motor
232 Second electric motor
233 Driving shaft
234 Driving shaft
240 Gear assembly
241 First gear
242 Second gear
260 Cam ring
270 Third gear
280 Detection circuit
300 Remote operation device

DETAILED DESCRIPTION OF THE EMBODIMENTS

The present disclosure is described with reference to embodiments, but following embodiments do not limit the present disclosure. Not all combinations of features described in embodiments are necessary for solutions of the present disclosure.

FIG. 1 illustrates an exemplary schematic diagram of a camera device 100 according to some embodiments of the present disclosure. The camera device 100 includes a lens device 200 and a camera portion 102.

The camera portion 102 includes an image sensor 120, a camera controller 110, a memory 130, and a power supply 140. The lens device 200 includes a plurality of lenses 210, a plurality of lens holders 212, a lens controller 220, a memory 222, a first motor 231, a second motor 232, a gear assembly 240, a cam ring 260, and a detection circuit 280.

The image sensor 120 includes a charge coupled device (CCD) or a complementary metal oxide semiconductor (CMOS). The image sensor 120 outputs image data of an optical image captured by the plurality of lenses 210 to the camera controller 110. The camera controller 110 may include a microprocessor such as a central processing unit (CPU), a microprocessing unit (MPU), etc., or a microcontroller such as a microcontroller unit (MCU). The camera controller 110 can control the camera device 100 according to operation commands of the camera device 100 from user's operation unit. The memory 130 may be a computer-readable storage medium and may include at least one of static random-access memory (SRAM), dynamic random-access memory (DRAM), erasable programmable read-only memory (EPROM), electrically erasable programmable read-only memory (EEPROM), or a USB flash drive. The memory 130 stores programs for the camera controller 110 to control the image sensor 120. The memory 130 may be arranged inside a housing of the camera device 100. The memory 130 may be configured to be detachable from the housing of the camera device 100. The power supply 140 provides power to the camera portion 120 and the lens device 200. The power supply 140 may be a battery.

The lens device 200 may be an interchangeable lens detachable from the camera portion 102. The lens holder 212 supports the lens 210. The pin 214 arranged at the lens holder 212 cooperates with a cam groove of the cam ring 260. By rotating the cam ring 260, the pin 214 moves along the cam groove, and the lens 210 and the lens holder 212 move together toward a direction of an optical axis. The plurality of lenses 210 may function as a zoom lens, a varifocal lens, and a focus lens. At least some or all of the plurality of lenses 210 are configured to move along the optical axis.

The gear assembly 240 transmits power of the first electric motor 231 and the second electric motor 232 to the cam ring 260. The cam ring 260 receives the power transmitted from the first electric motor 231 and the second electric motor 232 through the gear assembly 240 and rotates by using the optical axis as a center. The first electric motor 231 and the second electric motor 232 may be direct current (DC) electric motors. The first electric motor 231 and the second electric motor 232 may also be direct current (DC) electric motors with brushes or without brushes. Electrical characteristics of the first motor 231 and the second motor 232 may be designed to be the same. The first motor 231 and the second motor 232 may be the same model. That is, the first motor 231 and the second motor 232 may be of the same type. The first motor 231 and the second motor 232 are examples of the first electric motor and the second electric motor, respectively.

The first motor 231 and the second motor 232 transmit the power to the cam ring 260 through the gear assembly 240 to cause the cam ring 260 to rotate. The detection circuit 280 detects a rotation speed of one of the first motor 231 and the second motor 232. The detection circuit 280 may include a photo interrupter, etc.

The lens controller 220 controls electrical power provided to the first electric motor 231 and the second electric motor 232 according to the rotation speed detected by the detection circuit 280. The lens controller 220 drives the first electric motor 231 and the second electric motor 232 based on lens control commands from the camera portion 102, which causes one or more of the plurality of lenses 210 to move along the optical axis through the gear assembly 240 and the cam ring 260. The lens control commands are, for example, zoom control commands and focus control commands. The lens controller 220 controls at least one of the lenses 210 to move along the optical axis to execute at least one of a zoom operation or a focus operation. For example, when the camera device 100 executes an automatic focus operation during video recording, the lens controller 220 controls the first electric motor 231 and the second electric motor 232 to cause the cam ring 230 to slightly rotate back and forth in a first direction and a second direction. The lens controller 220 slightly drives the focus lens back and forth to execute a wobbling operation. The wobbling operation is an operation that the lens controller 220 calculates an evaluation value indicating an image blurry degree such as a contrast value while the lens controller 220 slightly vibrates the focus lens along the optical axis, and then determines a direction for the focus lens to move along the optical axis and at the same time controls the focus lens to approach a focus status. The lens controller 220 is an example of a controller. The lens controller 220 executes the wobbling operation according to automatic focus commands from the camera portion 102.

The memory 222 stores control values of the plurality of lenses 210. The memory 222 may include at least one of SRAM, DRAM, EPROM, EEPROM, or a USB flash drive.

To improve optical characteristics, a size of the lens 210 needs to be increased. For example, when the lens device 200 is a lens device used in a medium format camera, the size of the lens 210 of the lens device 200 may be increased. If the size of the lens 210 is increased, weight of the lens 210 is also increased. For example, to drive a relatively heavy focus lens slightly back and forth through the wobbling operation, the electric motor needs to generate a relatively large torque.

By using an electric motor to generate a torque to drive one or more large size lenses 210, a size of the electric motor may be increased. If the size of the electric motor is increased, a size of a lens barrel for housing the lenses 210 is also increased. Thus, the lens device 200 according to some embodiments uses the two electric motors of the first electric motor 231 and the second electric motor 232 to drive the cam ring 260. Therefore, since the torque required by one electric motor is suppressed, a size increment of the electric motor is also suppressed.

In addition, if the two electric motors are configured to generate the torques, a total torque is larger than the torque generated by one electric motor. If the torque is increased, a reduction ratio of the gear assembly 240 can be reduced. That is, while the size increment of the electric motor is suppressed, a number of gears in the gear assembly 240 can be reduced. With reduced number of gears, energy loss can be suppressed. Further, with reduced number of gears, a noise of the gear assembly 240 can be reduced. Further, with reduced number of gears, a backlash impact can be reduced.

Using the two electric motors of the first electric motor 231 and the second electric motor 232 to drive the cam ring 260 can reduce the backlash impact. However, a backlash generated between the gears is not reduced. Therefore, a goal of embodiments of the present disclosure is to further reduce the backlash.

Figure 2:
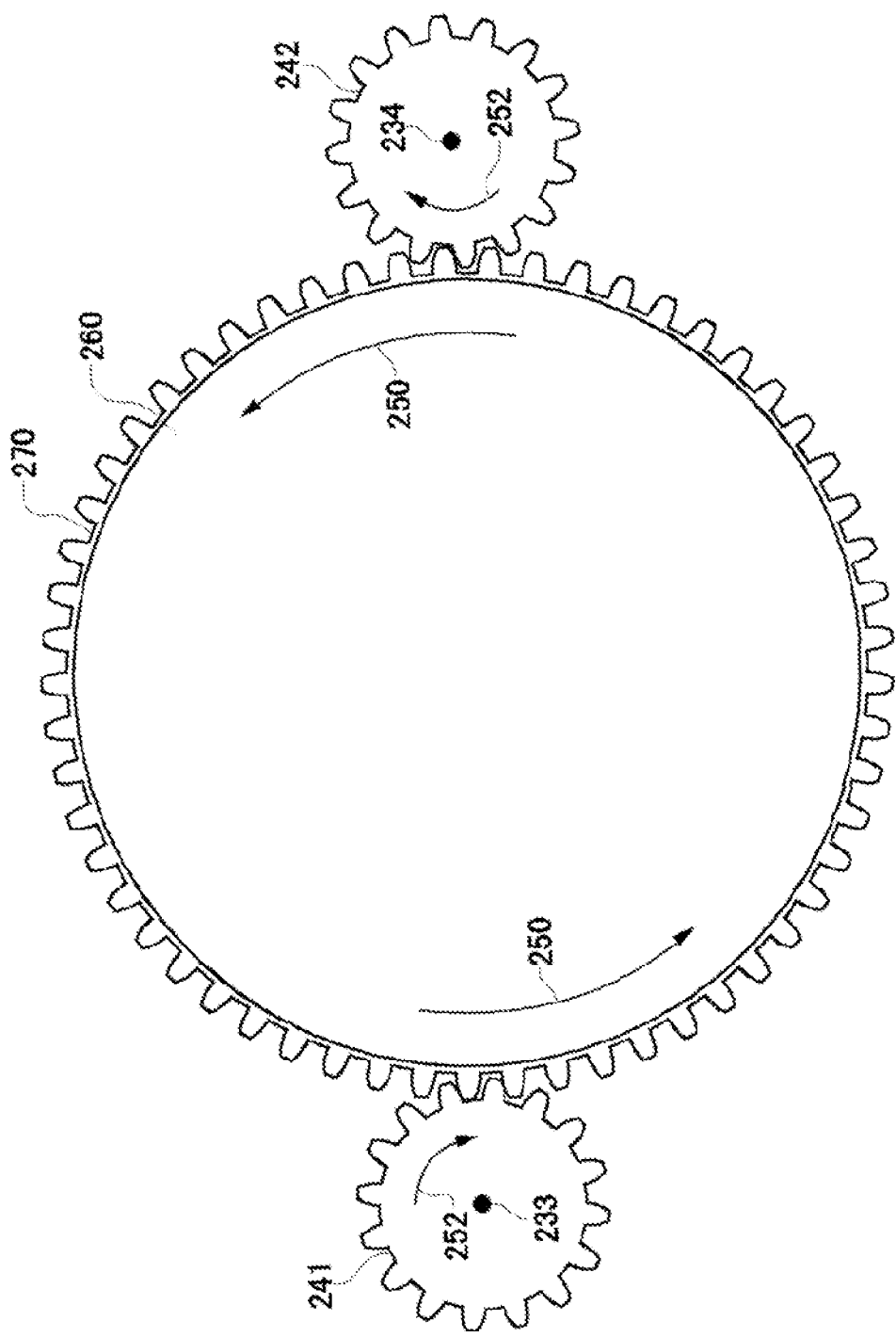
FIG. 2 illustrates an exemplary schematic diagram of a gear configuration of a gear assembly according to some embodiments of the present disclosure.

FIG. 2 illustrates an exemplary schematic diagram of a gear configuration of a gear assembly according to some embodiments of the present disclosure. The gear assembly 240 includes a first gear 241 connected to a driving shaft 233 of the first electric motor 231. The gear assembly 240 includes a second gear 242 connected to a driving shaft 234 of the second electric motor 232. The first gear 241 and the second gear 242 may be spur gears. The gear assembly 240 includes a third gear 270 that meshes with the first gear 241 and the second gear 242. The cam ring 260 includes the third gear 270. The third gear 270 is arranged at an outer circumferential surface of the cam ring 260.

Figure 3:
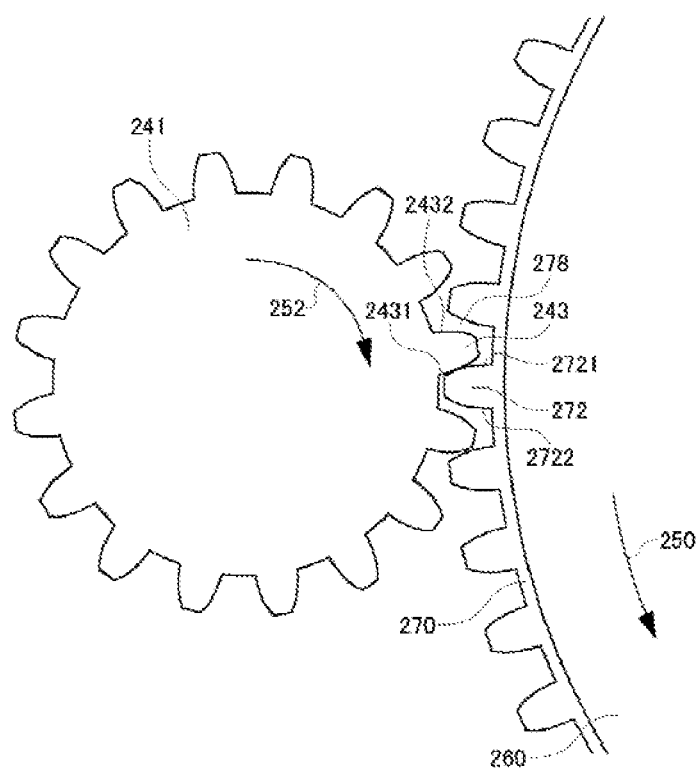
FIG. 3 illustrates an enlarged view of a meshing area of a first gear and a third gear according to some embodiments of the present disclosure.

FIG. 3 illustrates an enlarged view of a meshing area of the first gear 241 and the third gear 270 according to some embodiments of the present disclosure. The first gear 241 includes a plurality of teeth 243. A tooth 243 includes a tooth surface 2431 and a tooth surface 2432 opposite to the tooth surface 2431. The third gear 270 includes a plurality of teeth 272 configured to mesh with the teeth 243 of the first gear 241. A tooth 272 includes a tooth surface 2721 and a tooth surface 2722 opposite to the tooth surface 2721. When the tooth surface 2431 of the tooth 243 of the first gear 241 contacts the tooth surface 2721 of the tooth 272 of the third gear 270 and at the same time the first gear 241 rotates in a direction indicated by an arrow 252, the third gear 270 rotates in a direction indicated by an arrow 250. Therefore, a gap 278 exists between the tooth 243 of the first gear 241 and the tooth 272 of the third gear 270, that is, a backlash exists.

Figure 4:
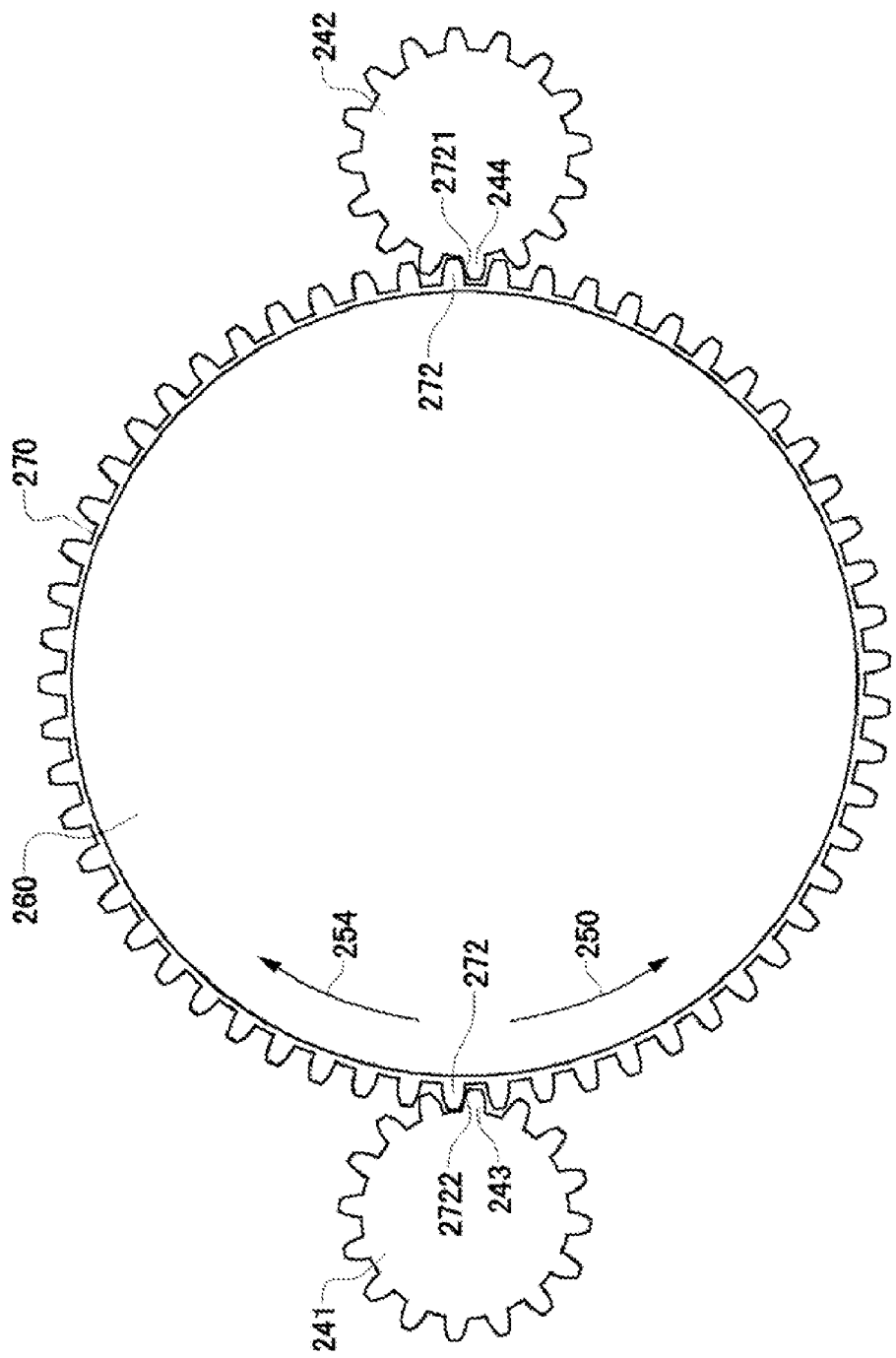
FIG. 4 illustrates an exemplary diagram showing a meshing status of the first gear and the third gear and a meshing status of a second gear and the third gear when a cam ring stops according to some embodiments of the present disclosure.

Consistent with the disclosure, the impact of the gap 278 is reduced. In some embodiments, when the lens controller 220 controls the cam ring 260, which is driven to rotate by the power transmitted from the first electric motor 231 and the power transmitted from the second electric motor 232, to stop, the lens controller 220 stops a rotation of the first electric motor 231 first and then stops a rotation of the second electric motor 232. Therefore, as shown in FIG. 4, the lens controller 220 controls the cam ring 260 to stop under a status that the tooth 243 of the first gear 241 contacts the tooth surface 2722 side of the tooth 272 of the third gear 270 and the tooth 244 of the second gear 242 contacts the tooth surface 2721 side of the tooth 272 of the third gear 270.

The lens controller 220 staggers timings to stop the rotation of the first electric motor 231 and the rotation of the second electric motor 232. Thus, the lens controller 220 controls the cam ring 260 to stop under a status that the tooth 243 of the first gear 241 and the tooth 244 of the second gear 242 contact different sides of tooth surfaces of the teeth 272 of the third gear 270. To start a rotation of the cam ring 260, the lens controller 220 causes one of the first electric motor 231 and the second electric motor 232 that can rotate without a backlash to rotate first.

For example, the lens controller 220 controls the cam ring 260, which rotates along a first direction (e.g., a direction indicated by an arrow 250 in FIG. 4), to stop by first stopping the rotation of the first electric motor 231 and then stopping the rotation of the second electric motor 232. Thereafter, when the lens controller 220 controls the cam ring 260 to rotate along a second direction (e.g., a direction indicated by an arrow 254 in FIG. 4) opposite to the first direction, the lens controller 220 first controls the first electric motor 231 to rotate and then controls the second electric motor 232 to rotate. As another example, the lens controller 220 controls the cam ring 260, which rotates along the first direction, to stop by first stopping the rotation of the first electric motor 231 and then stopping the rotation of the second electric motor 232. Thereafter, when the lens controller controls the cam ring 260 to rotate along the first direction, the lens controller 220 first controls the second electric motor 232 to rotate and then controls the first electric motor 231 to rotate.

When the lens controller 220 controls the cam ring 260 to stop, because the lens controller 220 staggers the stop timings of the two electric motors, then when the cam ring 260 is stopped, the tooth 243 of the first gear 241 and the tooth 244 of the second gear 242 are in contact with the tooth surfaces at different sides of the teeth 272 of the third gear 270. Thus, when the lens controller 220 controls the cam ring 260 to start to rotate, the electric motor that can start to rotate the third gear 270 without backlash starts to rotate earlier than the other electric motor. As such, no matter in which direction the cam ring 260 rotates, the backlash between the gears can be eliminated.

The lens controller 220 may control voltages applied to the first electric motor 231 and the second electric motor 232 to control the rotations of the first electric motor 231 and the second electric motor 232. When the lens controller 220 controls the cam ring 260 to stop, the lens controller 220 may first change the voltage applied to the first electric motor 231 from a first voltage (e.g., 5V), to a second voltage (e.g., 0V) lower than the first voltage, and then change the voltage applied to the second electric motor 232 from a third voltage (e.g., 5V) to a fourth voltage (e.g., 0V) lower than the third voltage. As such, the lens controller 220 can first stop the rotation of the first electric motor 231 and then stop the rotation of the second electric motor 232. The lens controller 220 may gradually change the voltage applied to the first electric motor 231 from the first voltage to the second voltage. The lens controller 220 may gradually change the voltage applied to the second electric motor 232 from the third voltage to the fourth voltage.

Figure 5:
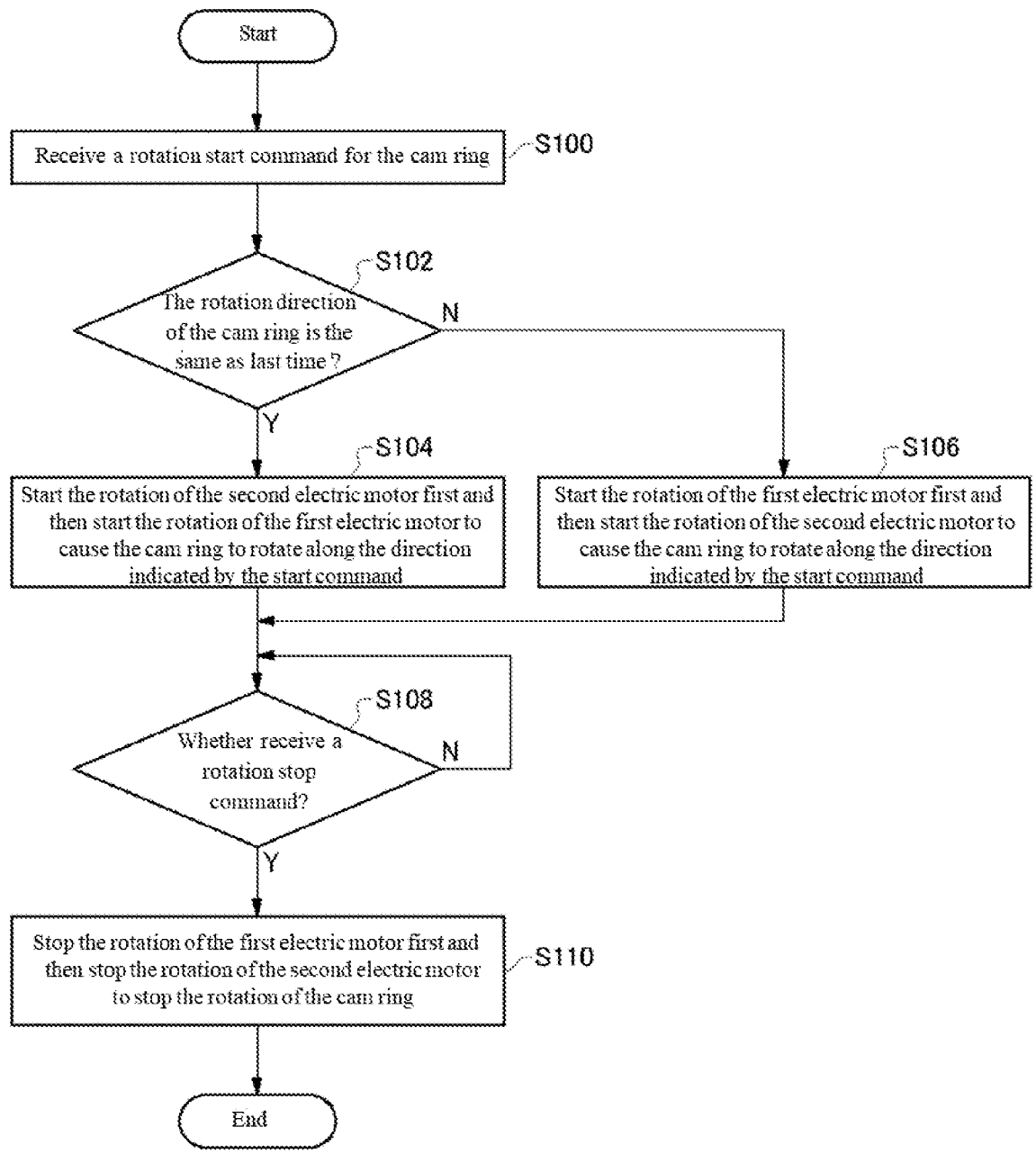
FIG. 5 illustrates an exemplary flowchart of a rotation control process of the cam ring executed by a lens controller according to some embodiments of the present disclosure.

FIG. 5 illustrates an exemplary flowchart of a rotation control process of the cam ring 260 executed by the lens controller 220 according to some embodiments of the present disclosure.

The lens controller 220 receives a rotation start command for the cam ring 260, such as a focus operation command, a wobbling operation command, etc., from the camera controller 110 (S100). The lens controller 220 determines if a rotation direction of the cam ring 260 is the same as last time (S102). The lens controller 220 may store a rotation direction of the cam ring 260 of last time in the memory 222. The rotation direction of the cam ring 260 of last time refers to the rotation direction of the cam ring 260 during last time of rotation before the lens controller 220 receives the rotation start command, and is also referred to as a "last rotation direction." The lens controller 220 can compare the current rotation direction of the cam ring 260 indicated by the start command to the rotation direction of the cam ring 260 of the last time stored in memory 222 to determine if the rotation direction of the cam ring is the same as last time.

If the rotation direction of the cam ring 260 is the same as last time, the lens controller 220 first starts the rotation of the second electric motor 232 and then starts the rotation of the first electric motor 231 to cause the cam ring 260 to rotate along the direction indicated by the start command (S104).

On the other hand, if the rotation direction of the cam ring 260 is different from last time, the lens controller 220 first starts the rotation of the first electric motor and then starts the rotation of the second electric motor to cause the cam ring 260 to rotate along the direction indicated by the start command (S106).

When the lens controller 220 receives a rotation stop command of the cam ring 260 from the camera controller 110 (S108), the lens controller 220 first stops the rotation of the first electric motor 231 and then stops the rotation of the second electric motor 232 to stop the rotation of the cam ring 260 (S110). As such, the lens controller 220 staggers the timings to stop the rotation of the first electric motor 231 and the rotation of the second electric motor 232. Thus, the lens controller 220 controls the cam ring 260 to stop under a status that the tooth 243 of the first gear 241 and the tooth 244 of the second gear 242 contact different sides of the tooth surfaces of the tooth 272 of the third gear 270. Therefore, when the lens controller 220 subsequently controls the cam ring 260 to rotate, the electric motor that can start to rotate the third gear 270 without the backlash starts to rotate earlier than the other electric motor. As such, no matter in which direction the cam ring 260 rotates, the backlash between the gears can be eliminated.

Figure 6:
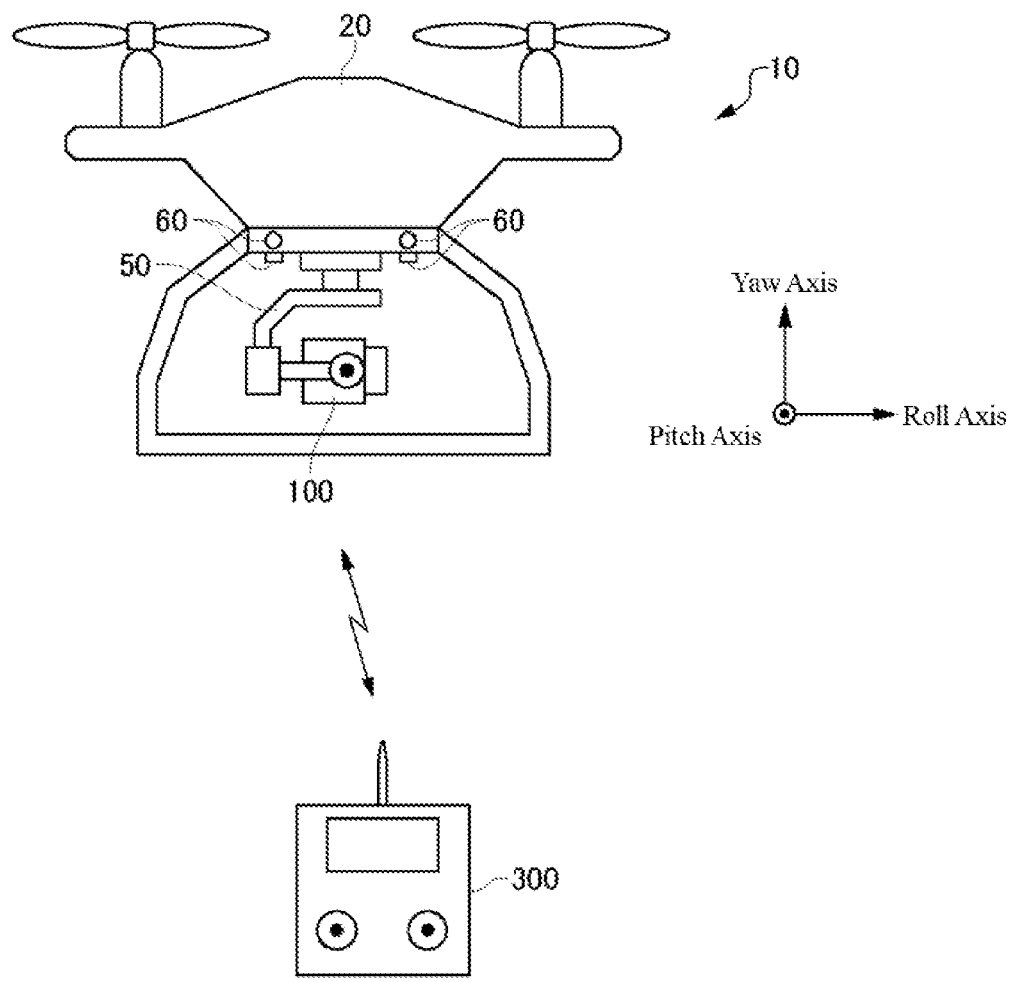
FIG. 6 illustrates an exemplary diagram of an appearance of an unmanned aerial vehicle (UAV) and a remote operation device according to some embodiments of the present disclosure.

The above-described camera device 100 may be carried by a movable body. The movable body can be, e.g., an unmanned aerial vehicle (UAV) shown in FIG. 6. The UAV 10 includes a UAV body 20, a gimbal 50, a plurality of camera devices 50, and a camera device 100. The gimbal 50 and the camera device 100 are an example of a camera system. The UAV 10 is an example of the movable body propelled by a propeller. In some other embodiments, the movable body can include an aerial body such as an airplane capable of moving in the air, a vehicle capable of moving on the ground, a ship capable of moving on the water, etc.

The UAV body 20 includes a plurality of rotors. The plurality of rotors are an example of the propeller. The UAV body 20 controls rotations of the plurality of rotors to cause the UAV 10 to fly. The UAV body 20 uses, for example, four rotors to cause the UAV 10 to fly. A number of the rotors is not limited to four. In some embodiments, the UAV 10 may also be a fixed-wing aircraft without a rotor.

The camera device 100 is an imaging camera that captures an object within a desired imaging range. The gimbal 50 can rotatably support the camera device 100. The gimbal 50 is an example of a supporting mechanism. For example, the gimbal 50 uses an actuator to rotatably support the camera device 100 on the pitch axis. The gimbal 50 uses the actuator to further support the camera device 100 rotatably by using the roll axis and the yaw axis as rotation axes. The gimbal 50 can rotate the camera device 100 around at least one of the yaw axis, the pitch axis, or the roll axis to change an attitude of the camera device 100.

The plurality of camera devices 60 are sensing cameras that sense surroundings to control flight of the UAV 10. Two of the camera devices 60 may be arranged at a head, i.e., the front, of the UAV 10. The other two camera devices 60 may be arranged at the bottom of the UAV 10. The two camera devices at the front can be used in pair, which function as a stereo camera. The two camera devices at the bottom may also be used in pair, which function as a stereo camera. The UAV 10 can generate three-dimensional space data for the surrounding of the UAV 10 based on images captured by the plurality of camera devices 60. A number of the camera devices 60 of the UAV 10 is not limited to four, and can be one. The UAV 10 may also have at least one camera device 60 at each of the head, tail, each side, bottom, and top. An angle of view that can be set in the camera device 60 may be larger than an angle of view that can be set in the camera device 100. The camera device 60 may have a single focus lens or a fisheye lens.

A remote operation device 300 communicates with the UAV 10 to control the UAV 10 remotely. The remote operation device 300 may communicate with the UAV 10 wirelessly. The remote operation device 300 transmits to the UAV 10 instruction information indicating various commands related to the movement of the UAV 10 such as ascent, descent, acceleration, deceleration, forward, backward, rotation, etc. The instruction information includes, for example, instruction information to ascend the UAV 10. The instruction information may indicate a desired height of the UAV 10. The UAV 10 moves to the height indicated by the instruction information received from the remote operation device 300. The instruction information may include an ascent command to ascend the UAV 10. The UAV 10 ascend when receiving the ascent command. When the UAV 10 reaches an upper limit of the height, even the UAV 10 receives the ascent command, the UAV 10 may be limited to ascend.

The present disclosure is described above with reference to embodiments, but the technical scope of the present disclosure is not limited to the scope described in the above embodiments. For those skilled in the art, various changes or improvements can be made to the above-described embodiments. It is apparent that such changes or improvements are within the technical scope of the present disclosure.

An execution order of various processing such as actions, sequences, processes, and stages in the devices, systems, programs, and methods shown in the claims, the specifications, and the drawings, can be any order, unless otherwise specifically indicated by "before," "in advance," etc., and as long as an output of previous processing is not used in subsequent processing. Operation procedures in the claims, the specifications, and the drawings are described using "first," "next," etc., for convenience. However, it does not mean that the operation procedures must be implemented in this order.

What is claimed is:

1. A lens device comprising:
    a first electric motor;
    a second electric motor;
    a lens;
    a cam ring configured to drive the lens in a direction of an optical axis of the lens;
    a first gear configured to transmit power generated by the first electric motor to the cam ring;
    a second gear configured to transmit power generated by the second electric motor to the cam ring; and
    a controller configured to, when controlling the cam ring to stop rotating, first stop a rotation of the first electric motor and then stop a rotation of the second electric motor.

2. The lens device of claim 1, wherein the controller is configured to:
    first stop the rotation of the first electric motor and then stop the rotation of the second electric motor to stop the cam ring from rotating in a first direction; and
    when controlling the cam ring to start to rotate in a second direction opposite to the first direction, first start the rotation of the first electric motor and then start the rotation of the second electric motor.

3. The lens device of claim 1, wherein the controller is configured to:
first stop the rotation of the first electric motor and then stop the rotation of the second electric motor to stop the cam ring from rotating in a direction; and
when controlling the cam ring to start to rotate in the direction again, first start the rotation of the second electric motor and then start the rotation of the first electric motor.

4. The lens device of claim 1, the controller is configured to:
first stop the rotation of the first electric motor and then stop the rotation of the second electric motor to stop the cam ring from rotating in a first direction;
when controlling the cam ring to start to rotate in a second direction opposite to the first direction, first start the rotation of the first electric motor and then start the rotation of the second electric motor; and
when controlling the cam ring to start to rotate again in the first direction, first start the rotation of the second electric motor and then start the rotation of the first electric motor.

5. The lens device of claim 1, further comprising:
a third gear meshing with the first gear and the second gear, and configured to transmit the power generated by the rotation of the first electric motor and the power generated by the rotation of the second electric motor to the cam ring.

6. The lens device of claim 5, wherein the cam ring includes the third gear.

7. The lens device of claim 5, wherein:
the third gear includes a plurality of teeth each including a first tooth surface and a second tooth surface opposite to the first tooth surface; and
the controller is configured to first stop the rotation of the first electric motor and then stop the rotation of the second electric motor, to cause the cam ring to stop in a status where a tooth of the first gear contacts the first tooth surface of one of the teeth of the third gear and a tooth of the second gear contacts the second tooth surface of another one of the teeth of the third gear.

8. The lens device of claim 1, wherein the first electric motor and the second electric motor are direct current electric motors.

9. The lens device of claim 8, wherein the controller is further configured to, when controlling the cam ring to stop, first change a voltage applied to the first electric motor from a first voltage to a second voltage lower than the first voltage to stop the rotation of the first electric motor, then change a voltage applied to the second electric motor from a third voltage to a fourth voltage lower than the third voltage to stop the rotation of the second electric motor.

10. The lens device of claim 1, wherein the lens includes a focus lens.

11. A camera device, comprising:
a lens device including:
a first electric motor;
a second electric motor;
a lens;
a cam ring configured to drive the lens to a direction of an optical axis of the lens;
a first gear configured to transmit power generated by the first electric motor to the cam ring;
a second gear configured to transmit power generated by the second electric motor to the cam ring; and
a controller configured to, when controlling the cam ring to stop rotating, first stop a rotation of the first electric motor and then stop a rotation of the second electric motor; and
a camera configured to image using light captured by the lens device.

12. A movable body comprising:
a propeller configured to drive the movable body to move; and
a camera device including:
a lens device, including:
a first electric motor;
a second electric motor;
a lens;
a cam ring configured to drive the lens to an optical axis of the lens;
a first gear configured to transmit power generated by the first electric motor to the cam ring;
a second gear configured to transmit power generated by the second electric motor to the cam ring; and
a controller configured to, when controlling the cam ring to stop rotating, first stop a rotation of the first electric motor and then stop a rotation of the second electric motor; and
a camera configured to image using light captured by the lens device.

13. The movable body of claim 12, wherein the controller is configured to:
first stop the rotation of the first electric motor and then stop the rotation of the second electric motor to stop the cam ring from rotating in a first direction; and
when controlling the cam ring to start to rotate in a second direction opposite to the first direction, first start the rotation of the first electric motor and then start the rotation of the second electric motor.

14. The movable body of claim 12, wherein the controller is configured to:
first stop the rotation of the first electric motor and then stop the rotation of the second electric motor to stop the cam ring from rotating in a direction; and
when controlling the cam ring to start to rotate in the direction again, first start the rotation of the second electric motor and then start the rotation of the first electric motor.

15. The movable body of claim 12, the controller is configured to:
first stop the rotation of the first electric motor and then stop the rotation of the second electric motor to stop the cam ring from rotating in a first direction;
when controlling the cam ring to start to rotate in a second direction opposite to the first direction, first start the rotation of the first electric motor and then start the rotation of the second electric motor; and
when controlling the cam ring to start to rotate again in the first direction, first start the rotation of the second electric motor and then start the rotation of the first electric motor.

16. The movable body of claim 12, further comprising:
a third gear meshing with the first gear and the second gear, and configured to transmit the power generated by the rotation of the first electric motor and the power generated by the rotation of the second electric motor to the cam ring.

17. The movable body of claim 16, wherein the cam ring includes the third gear.

18. The movable body of claim 16, wherein:
the third gear includes a plurality of teeth each including a first tooth surface and a second tooth surface opposite to the first tooth surface; and
the controller is configured to first stop the rotation of the first electric motor and then stop the rotation of the second electric motor, to cause the cam ring to stop in a status where a tooth of the first gear contacts the first tooth surface of one of the teeth of the third gear and a tooth of the second gear contacts the second tooth surface of another one of the teeth of the third gear.

19. The movable body of claim 12, wherein the first electric motor and the second electric motor are direct current electric motors.

20. The movable body of claim 19, wherein the controller is further configured to, when controlling the cam ring to stop, first change a voltage applied to the first electric motor from a first voltage to a second voltage lower than the first voltage to stop the rotation of the first electric motor, then change a voltage applied to the second electric motor from a third voltage to a fourth voltage lower than the third voltage to stop the rotation of the second electric motor.

* * * * *